(12) United States Patent
Hsu et al.

(10) Patent No.: US 12,486,397 B2
(45) Date of Patent: Dec. 2, 2025

(54) RESIN COMPOSITION AND ARTICLE MANUFACTURED USING THE SAME

(71) Applicant: Elite Material Co., Ltd., Taoyuan (TW)

(72) Inventors: Tsung-Ju Hsu, Taoyuan (TW); Shu-Hao Chang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 154 days.

(21) Appl. No.: 18/137,026

(22) Filed: Apr. 20, 2023

(65) Prior Publication Data

US 2025/0051566 A1    Feb. 13, 2025

(30) Foreign Application Priority Data

Mar. 2, 2023   (TW) .................. 112107503

(51) Int. Cl.
*C08L 71/12*  (2006.01)
*C08J 5/24*  (2006.01)

(52) U.S. Cl.
CPC ............ *C08L 71/123* (2013.01); *C08J 5/244* (2021.05); *C08L 71/12* (2013.01); *C08L 71/126* (2013.01); *C08J 2371/12* (2013.01); *C08J 2409/06* (2013.01); *C08J 2433/06* (2013.01); *C08J 2453/02* (2013.01); *C08J 2469/00* (2013.01); *C08J 2479/08* (2013.01)

(58) Field of Classification Search
CPC ..... C08J 2469/00; C08L 71/12; C08L 71/126; C08L 69/00; C08G 64/0291
See application file for complete search history.

(56) References Cited

FOREIGN PATENT DOCUMENTS

WO    WO-2010060038 A1 *  5/2010 ............ C09J 169/00

* cited by examiner

*Primary Examiner* — Kregg T Brooks
(74) *Attorney, Agent, or Firm* — BACON & THOMAS, PLLC

(57) ABSTRACT

A resin composition is provided, which comprises: 1 part by weight to 20 parts by weight of a first resin represented by the following formula (1); and 70 parts by weight of a vinyl group-containing polyphenylene ether resin, Formula (1)

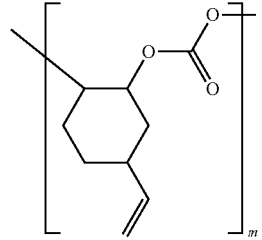

wherein m is an integer ranging from 10 to 250. The present invention also provides an article manufactured using the aforesaid resin composition.

21 Claims, 1 Drawing Sheet

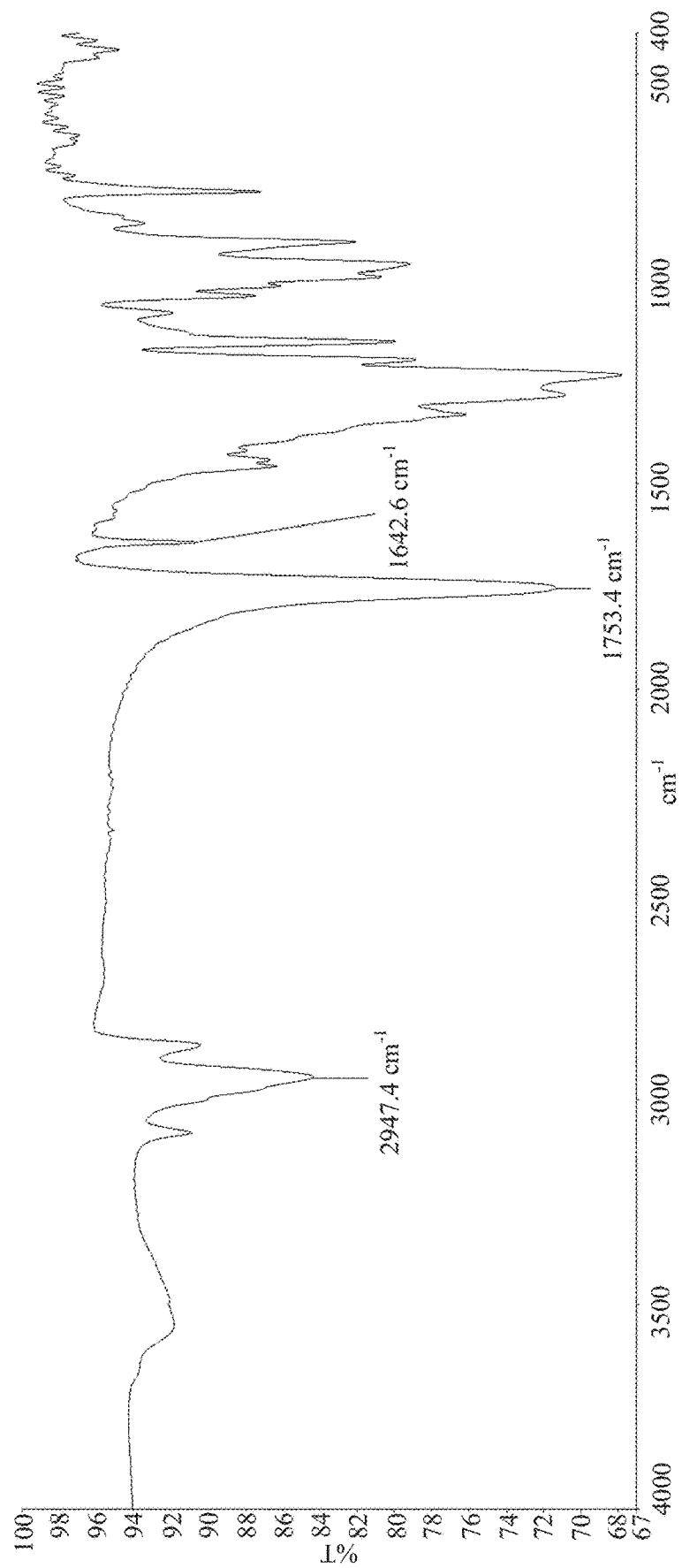

RESIN COMPOSITION AND ARTICLE MANUFACTURED USING THE SAME

CROSS-REFERENCE TO RELATED APPLICATIONS

This application claims the benefits of the Taiwan Patent Application Serial Number 112107503, filed on Mar. 2, 2023, the subject matter of which is incorporated herein by reference.

BACKGROUND OF THE INVENTION

Field

The present invention relates to a resin composition. More specifically, the present invention relates to a resin composition which can be used for preparing a prepreg, a resin film, a laminate or a printed circuit board.

Description of Related Art

The issue of global environmental protection and carbon reduction has attracted the attention of countries all over the world in recent years. International brand manufacturers have proposed carbon reduction management goals of carbon reduction and carbon neutrality, and carbon reduction management in the supply chain has become one of the main implementation plans. Therefore, polymers using carbon dioxide as a raw material (to achieve the purpose of carbon reduction) have been developed and applied to people's livelihood and industrial products.

In addition, with the rapid development of the fifth-generation mobile communication technology (5G), low-dielectric laminate materials suitable for high-frequency and high-speed signal transmission have also become the main development direction of the printed circuit board industry. Its technical requirements include that the laminate has low dielectric constant and low dissipation factor at high frequencies, so that the fabricated printed circuit board can be applied to 5G communication transmission with high frequency and high speed. For example, the dielectric constant of the low-dielectric laminate material measured at a frequency of 10 GHz is less than or equal to 3.5, and the dissipation factor measured at a frequency of 10 GHz is less than or equal to 0.0030. However, low dielectric laminate materials are usually accompanied with low copper foil peel strength (the force required to separate the insulating layer of the laminate from the copper foils adjacent and bonded thereto). Adding additional resin raw materials to increase the copper foil peel strength is usually accompanied with deterioration of low dielectric properties, or insufficient improvement in the copper foil peel strength. Therefore, how to maintain the low dielectric property of the laminate and effectively improve the copper foil peel strength is a technical direction that needs to be actively developed in this technical field.

SUMMARY OF THE INVENTION

In view of the problems encountered in the prior art, the main object of the present invention is to provide a resin composition, and products manufactured using the same.

To achieve the aforesaid object, the present invention provides a resin composition, which comprises: 1 part by weight to 20 parts by weight of a first resin represented by the following formula (1); and 100 parts by weight of a second resin, wherein the second resin comprises vinyl group-containing polyphenylene ether resin, maleimide resin, styrene-butadiene-divinylbenzene terpolymer resin, hydrogenated styrene-butadiene-styrene block copolymer resin or a combination thereof,

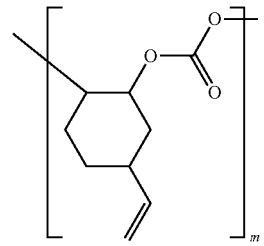

Formula (1)

wherein m is a positive integer of 10 to 250.

In addition, the present invention further provides another resin composition, which comprises: 1 part by weight to 20 parts by weight of a first resin represented by the following formula (1); and 70 parts by weight of a vinyl group-containing polyphenylene ether resin,

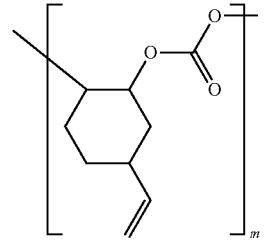

Formula (1)

wherein m is a positive integer of 10 to 250.

Existing low-dielectric resin compositions often face the problem of insufficient copper foil peel strength. In particular, when the roughness of the copper foil is reduced, the existing low-dielectric resin composition cannot be applied to the fields requiring low-roughness copper foils due to the insufficient copper foil peel strength thereof. In the resin composition of the present invention, by adding the resin having the structure of the formula (1), the resin composition not only maintains the low dielectric property, but also has improved copper foil peel strength. In particular, even if the resin composition of the present invention is formed on a low-roughness copper foil to form an insulating layer, because the resin composition of the present invention has improved copper foil peeling strength, the copper foil is not easy to peel off from the insulating layer. Therefore, the resin composition of the present invention is benefit to the field of using low-roughness copper foil.

Except for the aforesaid resin composition, the present invention further provides an article (or product) manufactured using the aforesaid resin composition, wherein the article may include, for example, a prepreg, a resin film, a laminate or a printed circuit board.

For example, in one embodiment, the article provided by the present invention has one, more or all of the following characteristics:

the copper foil peel strength of the copper-containing laminate measured by referring to the method described in IPC-TM-650 2.4.8 is greater than 3.0 lbs/inch;

the dielectric constant is less than or equal to 3.5 measured at a frequency of 10 GHz according to the method described in JIS C2565; and/or the dissipation factor is less than or equal to 0.0030 measured at a frequency of 10 GHz according to the method described in JIS C2565.

Other objects, advantages and novel features of the present invention will become more apparent from the following detailed description.

BRIEF DESCRIPTION OF DRAWINGS

FIG. 1 is a FTIR spectrum of the resin having the structure of the formula (1).

DETAILED DESCRIPTION OF THE INVENTION

In the present specification, the term "a" or "an" can be interpreted as including at least one, that is, including "one" or "plural".

In the present specification, the terms "comprise", "include", "have", "contain" or any other similar terms are open-ended transitional phrases. The terms "consisting of" and "consist" are closed-transitional phrases.

In the present specification, the range "10.0 to 20.0", "between 10.0 and 20.0" or "from 10.0 to 20.0" should be deemed to have been specifically disclosed all subranges such as 10.0 to 20.0, 10.0 to 11.0, 15.0 to 20.0, 11.0 to 19.0, etc.

In the present specification, the numerical values in the present invention include all numerical ranges that are the same as the numerical values after rounding to the number of significant digits of the numerical values.

Unless otherwise specified, in the present invention, "polymer" refers to a compound formed by monomers through polymerization reactions, and also includes polymer aggregates, and each polymer can be formed by multiple structural units connected by covalent bonds. In the present specification, "polymer" includes homopolymers, copolymers, prepolymers and the like. "Prepolymer" refers to a product formed by polymerization of multiple compounds, wherein the conversion rate may be greater than 10% (for example, 10% to 90%). "Polymer" may also include oligomers, which may be composed of multiple (for example, 2 to 20, usually 2 to 5) repeating units. For example, when referring to "diene polymer", it may include diene homopolymers, diene copolymers, diene prepolymers, or diene oligomers.

In the present invention, the copolymer refers to the product formed by polymerization reaction of two or more kinds of monomers, and includes but not limited to random copolymers, alternating copolymers, graft copolymers or block copolymers. For example, a styrene-butadiene copolymer is a product obtained by polymerization of only two kinds of monomers of styrene and butadiene. For example, styrene-butadiene copolymers include, but are not limited to styrene-butadiene random copolymers, styrene-butadiene alternating copolymers, styrene-butadiene graft copolymers or styrene-butadiene block copolymers. Styrene-butadiene block copolymers include, but are not limited to, the polymerized molecular structure of styrene-styrene-styrene-butadiene-butadiene-butadiene-butadiene. Styrene-butadiene block copolymers include, for example but are not limited to, styrene-butadiene-styrene block copolymers. Styrene-butadiene-styrene block copolymers include, for example but are not limited to, the polymerized molecular structure of styrene-styrene-styrene-butadiene-butadiene-butadiene-butadiene-styrene-styrene-styrene. Similarly, hydrogenated styrene-butadiene copolymers include hydrogenated styrene-butadiene random copolymers, hydrogenated styrene-butadiene alternating copolymers, hydrogenated styrene-butadiene graft copolymers or hydrogenated styrene-butadiene block copolymer. Hydrogenated styrene-butadiene block copolymers include, for example but are not limited to, hydrogenated styrene-butadiene-styrene block copolymers.

In the present invention, the term "resin" can include monomers, polymers formed by monomers, combinations of monomers, combinations of polymers formed by monomers or combinations of monomers and polymers formed by monomers. For example, in the present invention, "maleimide resin" includes maleimide monomers, maleimide polymers, combinations of maleimide monomers, combinations of maleimide polymers or combinations of maleimide monomers and maleimide polymers.

For example, in the present invention, "vinyl group-containing" includes vinyl group, vinylene group, allyl group, (meth)acrylate group, methacryloyl group or a combination thereof when interpreted. Herein, vinyl group includes vinylbenzyl group.

Unless otherwise specified, in the present invention, a modification includes: products obtained by modifying reactive functional groups of resins, homopolymers obtained by polymerization of resins, prepolymers obtained by polymerization of resins with other resins, copolymers obtained by polymerization of resins with other resins, or cross-linked polymers obtained by cross-linking resins with other resins, but the present invention is not limited thereto. For example, the modification may be to replace the original hydroxyl group with a vinyl group through a chemical reaction, or to obtain a terminal hydroxyl group through a chemical reaction between the original terminal vinyl group and p-aminophenol.

In the present invention, the unsaturated bond described in the present invention refers to the reactive unsaturated bond, such as but not limited to the unsaturated double bond that can cross-link with other functional groups, such as but not limited to the unsaturated carbon-carbon double bond that can cross-link with other functional groups.

In the present invention, when the specific examples of acrylate compounds are written in the form of "(methyl)", it should be interpreted that it includes both the aspect of containing a methyl group and the aspect of not containing a methyl group. For example, the "(meth)acrylate-containing polyphenylene ether resin" should be interpreted as including two aspects of methacrylate-containing polyphenylene ether resin and acrylate-containing polyphenylene ether resin.

In the present invention, the alkyl group described in the present invention includes its various isomers when interpreted, for example, propyl group should be interpreted as including n-propyl group and isopropyl group.

In the present specification, part(s) by weight represents weight part(s), which can be any weight unit, such as but not limited to kilogram(s), gram(s), pound(s) and other weight units. For example, 100 parts by weight of maleimide resin means that it can be 100 kg of maleimide resin or 100 lbs of maleimide resin. If the resin solution includes solvent and resin, the parts by weight of the general (solid or liquid) resin refers to the weight unit of the (solid or liquid) resin, and does not include the weight unit of the solvent in the solution. The parts by weight of the solvent refer to the weight unit of the solvent.

The present invention provides a resin composition, which comprises: 1 part by weight to 20 parts by weight of a first resin represented by the formula (1); and 100 parts by weight of a second resin, wherein the second resin comprises vinyl group-containing polyphenylene ether resin, maleimide resin, styrene-butadiene-divinylbenzene terpolymer resin, hydrogenated styrene-butadiene-styrene block copolymer resin or a combination thereof. The present invention provides another resin composition, which comprises: 1 part by weight to 20 parts by weight of a first resin represented by the formula (1); and 70 parts by weight of a vinyl group-containing polyphenylene ether resin. Hereinafter, the resin composition provided by the present invention will be further described.

First Resin

For example, in one embodiment, the content of the first resin represented by the formula (1) in the resin composition may range from 1 part by weight to 20 parts by weight, preferably 3 parts by weight to 18 parts by weight, and more preferably 5 parts by weight to 15 parts by weight.

For example, in one embodiment, the structure of the formula (1) may be the following formula (2):

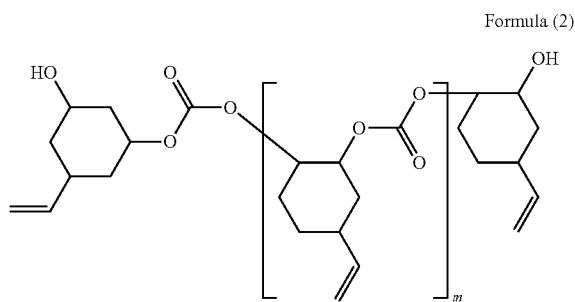

Formula (2)

wherein m is a positive integer from 10 to 250.

For example, in one embodiment, m in the formula (1) or formula (2) may be a positive integer of 10 to 250 respectively, preferably a positive integer of 30 to 120 respectively, and more preferably a positive integer of 40 to 105 respectively.

For example, in one embodiment, the number average molecular weight of the first resin having the structure of the formula (1) or formula (2) may be 2,000 to 40,000 respectively, preferably 5,000 to 20,000 respectively, and more preferably 7,000 to 17,000 respectively.

For example, in one embodiment, the resin composition of the present invention may be prepared using the first resin having the structure of the formula (1) or formula (2) with a molecular weight range. In one embodiment, the resin composition of the present invention may be prepared by using the first resin having the structure of the formula (1) or formula (2) with a number average molecular weight of 6,000 to 8,000. In one embodiment, the resin composition of the present invention may be prepared by using the first resin having the structure of the formula (1) or formula (2) with a number average molecular weight of about 7,000. In one embodiment, the resin composition of the present invention may be prepared by using the first resin having the structure of the formula (1) or formula (2) with a number average molecular weight of 16,000 to 18,000. In one embodiment, the resin composition of the present invention may be prepared by using the first resin having the structure of the formula (1) or formula (2) with a number average molecular weight of about 17,000. However, the present invention is not limited thereto.

For example, in one embodiment, the resin composition of the present invention may be prepared using the first resin having the structure of the formula (1) or formula (2) with two or more different molecular weight ranges. In one embodiment, the resin composition of the present invention may be prepared by using the first resin having the structure of the formula (1) or formula (2) with a number average molecular weight of 6,000 to 8,000 (low molecular weight) and the first resin having the structure of the formula (1) or formula (2) with a number average molecular weight of 16,000 to 18,000 (high molecular weight). In one embodiment, the resin composition of the present invention may be prepared by using the first resin having the structure of the formula (1) or formula (2) with a number average molecular weight of about 7,000 (low molecular weight) and the first resin having the structure of the formula (1) or formula (2) with a number average molecular weight of about 17,000 (high molecular weight). Herein, the weight ratio of the first resin having low molecular weight and the first resin having high molecular weight may ranges from 9:1 to 1:9, preferably from 7:3 to 3:7, and more preferably from 7:3 to 1:1. However, the present invention is not limited thereto.

In the present invention, the used first resin with the structure of the formula (1) or formula (2) is prepared using carbon dioxide as a reactant (carbon source), so the carbon reduction effect (reducing carbon dioxide) can be achieved. In addition, the carbonate structure in the first resin having the structure of the formula (1) or formula (2) also has the property of low combustion heat and/or biodegradability. Furthermore, the vinyl group in the first resin having the structure of the formula (1) or formula (2) can be further cross-linked with other compounds containing reactive functional groups, so that the application field of the resin composition is more extensive.

Second Resin

For example, in one embodiment, the resin composition (or the second resin thereof) may comprise vinyl group-containing polyphenylene ether resin.

For example, in one embodiment, unless otherwise specified, the vinyl group-containing polyphenylene ether resin mentioned in the various embodiments of the present invention may include polyphenylene ether resins with terminals modified by vinyl or allyl groups, such as vinylbenzyl group-containing polyphenylene ether resin. Alternatively, the vinyl group-containing polyphenylene ether resin may be (meth)acrylate-containing polyphenylene ether resin. For example, the vinyl group-containing polyphenylene ether resin includes, but is not limited to vinylbenzyl biphenyl-containing polyphenylene ether resin, methacrylate-containing polyphenylene ether resin, vinylbenzyl group-containing bisphenol A polyphenylene ether resin or a combination thereof. For example, the vinyl group-containing polyphenylene ether resin includes various polyphenylene ether resins disclosed in U.S. Patent Application Publication No. 2016/0185904 A1, and the entire contents of which are hereby incorporated by reference.

For example, in one embodiment, the vinyl group-containing polyphenylene ether resin may include various vinyl group-containing polyphenylene ether resins known in the art. The vinyl group-containing polyphenylene ether resin suitable for the present invention is not particularly limited, and may be any one or more commercially available products, self-made products or a combination thereof. In some embodiments, any one or more of the following vinyl group-containing polyphenylene ether resins may be used: vinylbenzyl biphenyl-containing polyphenylene ether resin (for example OPE-2st, available from Mitsubishi Gas Chemical Co.), methacrylate-containing polyphenylene ether resin (for example SA9000, available from Sabic), vinylbenzyl group-containing bisphenol A polyphenylene ether resin or a combination thereof. However, the present invention is not limited thereto.

For example, in one embodiment, the content of the vinyl group-containing polyphenylene ether resin in the resin composition (or the second resin thereof) may be 70 parts by weight. The contents of other resins are the relative contents related to 70 parts by weigh of the vinyl group-containing polyphenylene ether resin.

For example, in one embodiment, the vinyl group-containing polyphenylene ether resin in the resin composition (or the second resin thereof) may be methacrylate-containing polyphenylene ether resin.

For example, in one embodiment, the vinyl group-containing polyphenylene ether resin in the resin composition (or the second resin thereof) may include methacrylate-containing polyphenylene ether resin and vinylbenzyl biphenyl-containing polyphenylene ether resin. Herein, the weight ratio of the methacrylate-containing polyphenylene ether resin to the vinylbenzyl biphenyl-containing polyphenylene ether resin may range from 9:1 to 1:9, preferably from 6:1 to 1:6, and more preferably from 6:1 to 4:3. However, the present invention is not limited thereto.

For example, in one embodiment, the resin composition (or the second resin thereof) may selectively further include maleimide resin, and the content of maleimide resin is not limited. In one embodiment, with respect to 70 parts by weight of the vinyl group-containing polyphenylene ether resin, the resin composition (or the second resin thereof) may selectively further include 1 part by weight to 40 parts by weight of maleimide resin, but the present invention is not limited thereto. In one embodiment, the resin composition (or the second resin thereof) may not contain maleimide resin, and at this time, the content of maleimide resin is 0 parts by weight; here, it means that maleimide resin is not intentionally added into the resin composition (or the second resin thereof).

For example, in one embodiment, examples of maleimide resin include, but are not limited to 4,4'-diphenylmethane bismaleimide, polyphenylmethane maleimide (or called as oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl) hexane, N-2,3-xylylmaleimide, N-2,6-xylylmaleimide, N-phenylmaleimide, vinyl benzyl maleimide (VBM), maleimide with biphenyl structure, maleimide resin containing aliphatic long chain structure, prepolymer of diallyl compound and maleimide resin, prepolymer of diamine and maleimide resin, prepolymer of multifunctional amine and maleimide resin, prepolymer of acidic phenolic compound and maleimide resin or a combination thereof. Modifications of these components are also included in the interpretation.

For example, examples of maleimide resin include, but are not limited to, maleimide resin produced by Daiwakasei Industry Co., Ltd. with trade names BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 or BMI-7000H, maleimide resin produced by K.I Chemical Co., Ltd. with trade names BMI-70 or BMI-80, or maleimide resin produced by Nippon Kayaku Co., Ltd. with trade names MIR-3000 or MIR-5000.

For example, examples of maleimide resin containing aliphatic long chain structure include, but are not limited to, maleimide resin produced by Designer Molecular Co., Ltd. with trade names BMI-689, BMI-1400, BMI-1500, BMI-1700, BMI-2500, BMI-3000, BMI-5000 or BMI-6000.

The aforementioned maleimide resins can be used alone or in combination of two or more.

For example, in one embodiment, when the resin composition (or the second resin thereof) comprises maleimide resin, the content of the maleimide resin may range from 1 part by weight to 40 parts by weight, preferably from 1 part by weight to 20 parts by weight, more preferably from 1 part by weight to 15 parts by weight, and most preferably from 5 parts by weight to 10 parts by weight. However, the present invention is not limited thereto, and the content of the maleimide resin may be adjusted according to the needs.

For example, in one embodiment, the resin composition (or the second resin thereof) may selectively further include vinyl group-containing polyolefin, and the content of vinyl group-containing polyolefin is not limited. In one embodiment, with respect to 70 parts by weight of the vinyl group-containing polyphenylene ether resin, the resin composition (or the second resin thereof) may selectively further include 1 part by weight to 40 parts by weight of vinyl group-containing polyolefin, but the present invention is not limited thereto. In one embodiment, the resin composition (or the second resin thereof) may not contain vinyl group-containing polyolefin, and at this time, the content of vinyl group-containing polyolefin is 0 parts by weight; here, it means that vinyl group-containing polyolefin is not intentionally added into the resin composition (or the second resin thereof).

For example, in one embodiment, the type of vinyl group-containing polyolefin is not limited, and may include various vinyl group-containing olefin polymers known in the art. Examples of vinyl group-containing polyolefin include, but are not limited to polybutadiene, polyisoprene, styrene-butadiene copolymer, styrene-isoprene copolymer, styrene-butadiene-divinylbenzene terpolymer, styrene-butadiene-maleic anhydride terpolymer, vinyl group-polybutadiene-urea ester oligomer, maleic anhydride-butadiene copolymer, or a combination thereof.

For example, in one embodiment, the resin composition (or the second resin thereof) may selectively further include a styrene-butadiene-divinylbenzene terpolymer resin. In one embodiment, the resin composition (or the second resin thereof) may not contain styrene-butadiene-divinylbenzene terpolymer resin, and at this time, the content of styrene-butadiene-divinylbenzene terpolymer resin is 0 parts by weight; here, it means that styrene-butadiene-divinylbenzene terpolymer resin is not intentionally added into the resin composition (or the second resin thereof).

For example, in one embodiment, when the resin composition (or the second resin thereof) comprises vinyl group-containing polyolefin polymer (for example, styrene-butadiene-divinylbenzene terpolymer resin), the content of the vinyl group-containing polyolefin polymer may range from 1 part by weight to 40 parts by weight, preferably from 5 parts by weight to 35 parts by weight, more preferably from 5 parts by weight to 30 parts by weight, and most preferably from 10 parts by weight to 20 parts by weight. However, the present invention is not limited thereto, and the content of the vinyl group-containing polyolefin polymer (for example, styrene-butadiene-divinylbenzene terpolymer resin) may be adjusted according to the needs.

For example, in one embodiment, the resin composition (or the second resin thereof) may selectively further include hydrogenated polyolefin, and the content of hydrogenated polyolefin is not limited. In one embodiment, with respect to 70 parts by weight of the vinyl group-containing polyphenylene ether resin, the resin composition (or the second resin thereof) may selectively further comprise 1 part by weight to 35 parts by weight of hydrogenated polyolefin, but the present invention is not limited thereto. In one embodiment, the resin composition (or the second resin thereof) may not contain hydrogenated polyolefin, and at this time, the content of hydrogenated polyolefin is 0 parts by weight; here, it means that hydrogenated polyolefin is not intentionally added into the resin composition (or the second resin thereof).

For example, in one embodiment, the type of hydrogenated polyolefin is not limited, and may include various hydrogenated styrene-butadiene-styrene block copolymers (also called as styrene-ethylene/butylene-styrene copolymer). The hydrogenated polyolefin suitable for the present invention is not particularly limited, and may be any one or more commercially available products, self-made products or a combination thereof. For example, in one embodiment, hydrogenated polyolefin may include, but is not limited to, hydrogenated styrene-butadiene-styrene block copolymer, hydrogenated styrene-butadiene-styrene block copolymers substituted with maleic anhydride or a combination thereof. That is, hydrogenated polyolefin may include, but is not limited to, unsubstituted hydrogenated styrene-butadiene-styrene triblock copolymers, hydrogenated styrene-butadiene-styrene triblock copolymers substituted with maleic anhydride or a combination thereof. For example, in one embodiment, the hydrogenated polyolefin may be hydrogenated polyolefin produced by Asahi KASEI Corporation with the trade names H1221, H1062, H1521, H1052, H1041, H1053, H1051, H1517, H1043, N504, H1272, M1943, M1911 or M1913, or hydrogenated polyolefin produced by KRATON company with trade names G1650, G1651, G1652, G1654, G1657, G1726, FG1901 or FG1924, or hydrogenated polyolefins produced by Kuraray Company with trade names 8004, 8006 or 8007L.

For example, in one embodiment, the resin composition (or the second resin thereof) may selectively further include hydrogenated styrene-butadiene-styrene block copolymer resin, and the content of the hydrogenated styrene-butadiene-styrene block copolymer resin is not limited. In one embodiment, with respect to 70 parts by weight of the vinyl group-containing polyphenylene ether resin, the resin composition (or the second resin thereof) may selectively further comprise 1 part by weight to 35 parts by weight of hydrogenated styrene-butadiene-styrene block copolymer resin, but the present invention is not limited thereto. In one embodiment, the resin composition (or the second resin thereof) may not contain hydrogenated styrene-butadiene-styrene block copolymer resin, and at this time, the content of hydrogenated styrene-butadiene-styrene block copolymer resin is 0 parts by weight; here, it means that hydrogenated styrene-butadiene-styrene block copolymer resin is not intentionally added into the resin composition (or the second resin thereof).

For example, in one embodiment, when the resin composition (or the second resin thereof) comprises hydrogenated polyolefin (for example, hydrogenated styrene-butadiene-styrene block copolymer resin), the content of the hydrogenated polyolefin may range from 1 part by weight to 35 parts by weight, preferably from 1 part by weight to 30 parts by weight, more preferably from 1 part by weight to 15 parts by weight, and most preferably from 5 parts by weight to 10 parts by weight. However, the present invention is not limited thereto, and the content of the hydrogenated polyolefin (for example, hydrogenated styrene-butadiene-styrene block copolymer resin) may be adjusted according to the needs.

Other Additives

For example, in one embodiment, the resin composition may selectively further include an inorganic filler, and the content of the inorganic filler is not limited. In one embodiment, with respect to 70 parts by weight of the vinyl group-containing polyphenylene ether resin, the resin composition (or the second resin thereof) may selectively further comprise 30 parts by weight to 130 parts by weight of the inorganic filler, but the present invention is not limited thereto.

For example, in one embodiment, the content of the inorganic filler in the resin composition may range from 30 parts by weight to 130 parts by weight, preferably from 40 parts by weight to 130 parts by weight, more preferably from 50 parts by weight to 130 parts by weight, and most preferably from 60 parts by weight to 125 parts by weight. However, the present invention is not limited thereto, and the content of the inorganic filler may be adjusted according to the needs.

For example, in one embodiment, the inorganic filler in the resin composition may be silicon dioxide. For example, in one embodiment, the inorganic filler in the resin composition may be spherical silica.

For example, in one embodiment, the spherical silica may include various types of spherical silica known in the art, and the particle size distribution D50 of the spherical silica may be, for example, less than or equal to 2.0 µm. For example, the particle size distribution D50 of the spherical silica may preferably range from 0.2 µm to 2.0 µm, for example, but not limited to 0.2 µm, 0.3 µm, 0.4 µm, 0.6 µm, 0.8 µm, 1.2 µm, 1.3 µm or 2.0 µm. In the present invention, the particle size distribution D50 refers to the particle size corresponding to the cumulative volume distribution of fillers (such as but not limited to spherical silica) reaching 50% as measured by laser scattering. The spherical silica suitable for the present invention is not particularly limited, and may be any one or more commercially available products, such as but not limited to spherical silica purchased from Admatechs Company, or spherical silica purchased from Denka Company.

For example, in one embodiment, the spherical silica may optionally be pretreated with silane coupling agents, such as but not limited to amino silane coupling agents, epoxy silane coupling agents, vinyl silane coupling agent or acrylate silane coupling agent. With respect to 100 parts by weight of the spherical silica, the content of the aforesaid silane coupling agents for pretreatment may range from 0.005 parts by weight to 0.5 parts by weight, but the present invention is not limited thereto.

For example, in one embodiment, the resin composition may selectively further comprise a hardening initiator, and the content of the hardening initiator is not limited. In one embodiment, with respect to 70 parts by weight of the vinyl group-containing polyphenylene ether resin, the resin composition (or the second resin thereof) may selectively further comprise 0.01 parts by weight to 0.5 parts by weight of the hardening initiator, but the present invention is not limited thereto.

For example, in one embodiment, the content of the hardening initiator in the resin composition may range from 0.01 parts by weight to 0.5 parts by weight, preferably from 0.05 parts by weight to 0.5 parts by weight, more preferably from 0.1 parts by weight to 0.5 parts by weight, and most preferably from 0.1 parts by weight to 0.4 parts by weight. However, the present invention is not limited thereto, and the content of the hardening initiator may be adjusted according to the needs.

In the present invention, the hardening initiator in the resin composition may be any one or more hardening initiators suitable for making prepregs, laminates or printed circuit boards. The hardening initiator may be peroxides, azo initiators, carbon-carbon initiators or a combination thereof. For example, in one embodiment, the hardening initiator in the resin composition may be peroxide. Examples of the peroxide may include, but are not limited to dibenzoyl peroxide (BPO), dicumyl peroxide (DCP), 2,5-dimethyl-2,5-di(tert-butylperoxy) hexane, 2,5-dimethyl-2,5-bis(tert-butylperoxy)-3-hexyne (25B), di-tert-butyl peroxide, bis (tert-butylperoxyisopropyl)benzene, bis(tert-butyl peroxy) phthalate, bis(tert-butyl peroxy) isophthalate, tert-butyl peroxybenzoate, 2,2-bis(tert-butyl peroxy) butane, 2,2-bis(tert-butylperoxy) octane, 2,5-dimethyl-2,5-bis(benzoylperoxy) hexane, lauryl peroxide, tert-hexyl pivalate peroxide, dibutyl cumene peroxide and bis(4-tert-butylcyclohexyl) peroxydicarbonate or a combination thereof.

For example, in one embodiment, the resin composition may selectively further include triallyl isocyanurate. In one embodiment, the resin composition may not contain triallyl isocyanurate, and at this time, the content of triallyl isocyanurate is 0 parts by weight; here, it means that triallyl isocyanurate is not intentionally added into the resin composition (or the second resin thereof).

For example, in one embodiment, when the resin composition comprises triallyl isocyanurate, the content of the triallyl isocyanurate may range from 1 part by weight to 50 parts by weight, preferably from 1 part by weight to 35 parts by weight, more preferably from 1 part by weight to 30 parts by weight, and most preferably from 1 part by weight to 10 parts by weight. In one embodiment, the content of the triallyl isocyanurate may be about 5 parts by weight. However, the present invention is not limited thereto, and the content of the triallyl isocyanurate may be adjusted according to the needs.

For example, in one embodiment, the resin composition may selectively further include an inhibitor, and the content of the inhibitor is not limited. In one embodiment, with respect to 70 parts by weight of the vinyl group-containing polyphenylene ether resin, the resin composition (or the second resin thereof) may selectively further comprise 0.1 parts by weight to 0.5 parts by weight of the inhibitor, but the present invention is not limited thereto. In one embodiment, the resin composition may not contain an inhibitor, and at this time, the content of the inhibitor is 0 parts by weight; here, it means that the inhibitor is not intentionally added into the resin composition.

For example, in one embodiment, when the resin composition comprises the inhibitor, the content of the inhibitor may range from 0.1 parts by weight to 0.5 parts by weight, for example, may be 0.1 parts by weight, 0.2 parts by weight, 0.3 parts by weight, 0.45 parts by weight or 0.5 parts by weight. However, the present invention is not limited thereto, and the content of the inhibitor may be adjusted according to the needs.

In the present invention, the inhibitor in the resin composition may be any one or more inhibitors suitable for making prepregs, laminates or printed circuit boards. The inhibitor includes various molecular polymerization inhibitors, stable free radical polymerization inhibitors or a combination thereof known in the art. For example, the molecular polymerization inhibitors include, but are not limited to, phenolic compounds, quinone compounds, aromatic amine compounds, aromatic hydrocarbon nitro compounds, sulfur-containing compounds, variable-valent metal chlorides, or a combination thereof. More specifically, the molecular polymerization inhibitors include, but are not limited to, phenol, hydroquinone, 4-tert-butylcatechol, benzoquinone, chloranil, 1,4-naphthoquinone, trimethylquinone, aniline, nitrobenzene, $Na_2S$, $FeCl_3$, $CuCl_2$ or a combination thereof. For example, the stable free radical polymerization inhibitors include, but are not limited to, 1,1-diphenyl-2-trinitrophenylhydrazine (DPPH), triphenylmethyl, 2,2,6,6-tetramethyl piperidine-1-oxide, derivatives of 2,2,6,6-tetramethylpiperidine-1-oxide, or a combination thereof.

For example, in one embodiment, the resin composition may selectively further include a flame retardant. In one embodiment, the resin composition may not contain the flame retardant, and at this time, the content of the flame retardant is 0 parts by weight; here, it means that the flame retardant is not intentionally added into the resin composition.

For example, in one embodiment, when the resin composition comprises the flame retardant, the content of the flame retardant may be 30 parts by weight to 90 parts by weight, for example, may be 30 parts by weight, 40 parts by weight, 50 parts by weight, 60 parts by weight, 70 parts by weight, 80 parts by weight or 90 parts by weight. However, the present invention is not limited thereto, and the content of the flame retardant may be adjusted according to the needs.

In the present invention, the flame retardant in the resin composition may be any one or more flame retardants suitable for making prepregs, laminates or printed circuit boards, such as but not limited to phosphorus-containing flame retardants, preferably including: ammonium polyphosphate, hydroquinone bis-(diphenyl phosphate), bisphenol A bis-(diphenylphosphate), tri (2-carboxyethyl) phosphine (TCEP), tris(chloroisopropyl)phosphate, trimethyl phosphate (TMP), dimethyl methyl phosphonate (DMMP), resorcinol bis(dixylenyl phosphate), RDXP (such as commercially available products PX-200, PX-201 or PX-202), phosphazene (such as commercially available products SPB-100, SPH-100 or SPV-100), melamine polyphosphate, 9,10-dihydro-9-oxa-10-phosphaphenanthrene-10-oxide (DOPO) or derivatives thereof (such as di-DOPO compound) of resin thereof (such as DOPO-HQ, DOPO-NQ, DOPO-PN or DOPO-BPN), DOPO-bonding epoxy, diphenylphosphine oxide (DPPO) or derivatives thereof (such as di-DPPO compound) or resin thereof, melamine cyanurate, tri-hydroxyethyl isocyanurate, aluminum phosphinate (such as commercially available products OP-930 or OP-935) or a combination thereof. Herein, DOPO-PN is DOPO phenol novolak resin, and DOPO-BPN may be DOPO bisphenol novolac resin such as DOPO-BPAN (DOPO-bisphenol A novolac), DOPO-BPFN (DOPO-bisphenol F novolac) or DOPO-BPSN (DOPO-bisphenol S novolac).

For example, in one embodiment, the resin composition may selectively further include polysiloxane. In one embodiment, the resin composition may not contain polysiloxane, and at this time, the content of polysiloxane is 0 parts by weight; here, it means that polysiloxane is not intentionally added into the resin composition.

For example, in one embodiment, when the resin composition comprises polysiloxane, the content of the polysiloxane may range from 5 parts by weight to 30 parts by weight, for example, 5 parts by weight, 10 parts by weight or 15 parts by weight. However, the present invention is not limited thereto, and the content of polysiloxane may be adjusted according to the needs.

For example, in one embodiment, the polysiloxane in the resin composition may include, but are not limited to the polysiloxane available from Shin-Etsu Company with trade names X-22-161A, X-22-161B, X-22-163A, X-22-163B or X-22-164.

For example, in one embodiment, the resin composition may selectively further comprise at least one compound selected from the group consisting of: divinylbenzene, bis(vinylbenzyl) ether, bis(vinylphenyl) ethane, bis(vinylphenyl)dimethylene benzene, bis(vinylphenyl)dimethylene ether, bis(vinylphenyl) diethylenebenzene, divinylnaphthalene, divinylbiphenyl, self-polymers of divinylbenzene, copolymers of divinylbenzene and other vinyl group-containing compounds, styrene, polystyrene, triallyl cyanurate, 1,2,4-trivinylcyclohexane, polyfunctional acrylates, dicyclopentadiene, norbornene, and acenaphthylene. The aforementioned compounds may be used alone or in combination. Furthermore, for example, in one embodiment, the contents of the aforementioned compounds may respectively range from 1 part by weight to 50 parts by weight, preferably from 1 part by weight to 40 parts by weight, more preferably from 1 part by weight to 30 parts by weight and most preferably from 1 parts by weight to 10 parts by weight. However, the present invention is not limited thereto, and the content of the aforementioned compounds may be adjusted according to the needs.

For example, in one embodiment, the resin composition may selectively further comprise bis(vinylphenyl) ethane, and the content thereof may range from 1 part by weight to 10 parts by weight, preferably from 1 part by weight to 7.5 parts by weight, and more preferably from 1 part by weight to 5 parts by weight.

For example, in one embodiment, the resin composition may selectively further comprise at least one component selected from the group consisting of: inorganic fillers other than spherical silica, solvents, silane coupling agents, colorants, toughening agents and core-shell rubbers. The aforementioned components may be used alone or in combination.

For example, in one embodiment, the content of the inorganic fillers other than spherical silica may range from 5 parts by weight to 100 parts by weight and preferably from 10 parts by weight to 80 parts by weight. However, the present invention is not limited thereto, and the content of the inorganic fillers other than spherical silica may be adjusted according to the needs.

For example, in one embodiment, the contents of silane coupling agents, colorants, toughening agents and core-shell rubbers may respectively range from 0.01 parts by weight to 100 parts by weight, for example but not limited to, from 0.01 parts by weight to 3 parts by weight, from 30 parts by weight to 80 parts by weight or from 50 parts by weight to 100 parts by weight. However, the present invention is not limited thereto, and the contents of the aforementioned components may be adjusted according to the needs.

For example, in one embodiment, the aforementioned inorganic fillers other than spherical silica may be any one or more of the inorganic fillers other than spherical silica suitable for making prepregs, laminates or printed circuit boards. Examples thereof include, but are not limited to, non-spherical silicon dioxide (that is, the known irregular type, and the irregular type is not spherical), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate modified talc, zinc oxide, zirconia, mica, boehmite (AlOOH), calcined talc, talc, silicon nitride or calcined kaolin. In addition, except for the aforementioned non-spherical silica, the aforementioned inorganic fillers may be spherical, fibrous, plate-like, granular, flake-like, needle-like or whisker-like. The inorganic fillers other than spherical silica may selectively be pretreated with a silane coupling agent. The examples and amount of the silane coupling agent used to pretreat the inorganic fillers are as mentioned above, and are not repeated here.

The main function of adding solvent is to dissolve the components in the resin composition, change the solid content of the resin composition, and adjust the viscosity of the resin composition. Examples of the solvent include, but are not limited to, methanol, ethanol, ethylene glycol monomethyl ether, acetone, butanone (also known as methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethylformamide, dimethylacetamide, nitromethylpyrrolidone or a combination thereof. The using amount of the aforesaid solvent is not particularly limited, and may be adjusted according to the desired viscosity of the resin composition.

In the present invention, the silane coupling agent used as the additive for the resin composition may include silane (such as but not limited to siloxane), which can be divided into amino silane, epoxide silane, vinyl silane, ester silane, hydroxy silane, isocyanate silane, methacryloxysilane and acryloxysilane according to the types of the functional groups. The amount of the aforementioned silane coupling agent is not particularly limited, and can be adjusted depending on the dispersibility of the inorganic fillers in the resin composition.

In the present invention, the colorants suitable for the present invention may include but not limited to dyes or pigments.

In the present invention, the toughening agent is added to improve the toughness of the resin composition. In the present invention, the toughening agent suitable for the present invention may include but not limited to carboxyl-terminated butadiene acrylonitrile rubber (CTBN).

In the present invention, the core-shell rubber applicable to the present invention may include commercially available core-shell rubbers.

Article Manufactured Using the Resin Composition

The aforesaid resin composition provided by the present invention may be made into various articles through various processing methods, including but not limited to prepregs, laminates or printed circuit boards.

For example, the resin composition provided by the present invention can be made into a prepreg (i.e., the resin composition provided by the present invention can be used to make a prepreg), which includes a reinforcing material and a layered structure disposed thereon. The layered structure is formed by heating the aforementioned resin composition to a semi-cured state (B-stage). The temperature for making the prepreg may be between 120° C. and 180° C., and preferably between 140° C. and 160° C. The reinforcing material may be any one of fiber material, woven fabric, and non-woven cloth, and the woven cloth preferably includes glass fiber fabric. The type of glass fiber fabric is not particularly limited, and can be various commercially available glass fiber fabrics that can be used for printed circuit boards, such as E-type glass fiber fabric (i.e., E-glass fiber fabric), D-type glass fiber fabric, S-type glass fiber fabric, T-type glass fiber fabric, L-shaped glass fiber fabric or Quartz fiber fabric, wherein the types of fibers include yarn and roving, and the form may include spread form or standard form. The aforementioned non-woven fabric preferably includes liquid crystal resin non-woven fabric, such as polyester non-woven fabric, polyurethane non-woven fabric, etc., and is not limited thereto. The aforementioned woven fabric may also include liquid crystal resin woven fabric, such as polyester woven fabric or polyurethane woven fabric, and is not limited thereto. The reinforcing material can increase the mechanical strength of the prepreg. In one preferred embodiment, the reinforcing material may also be selectively pretreated with a silane coupling agent. After the prepreg is subsequently heated for curing (C-stage), an insulating layer can be formed.

For example, the aforementioned resin composition can be made into a resin film, which is obtained by heating and baking to semi-cure the aforementioned resin composition. The resin composition may be selectively applied on a polyethylene terephthalate film (PET film), a polyimide film (PI film), a copper foil or a resin-coated copper foil, followed by heating and baking to semi-cure the resin composition to form a resin film.

For example, the aforementioned resin composition can be made into a laminate.

For example, in one embodiment, the aforementioned laminate may include at least two metal foils and at least one insulating layer, the insulating layer is disposed between the two metal foils, and the insulating layer may be formed by laminating and curing the aforementioned resin composition at high temperature and under high pressure (C-stage). The suitable curing temperature is, for example, between 190° C. and 235° C., and preferably between 200° C. and 230° C.; the curing time may be 60 to 240 minutes, and preferably 90 to 180 minutes; and the suitable pressure may be 350 to 800 psi, and preferably 400 to 650 psi. The aforementioned insulating layer may be obtained by curing the aforementioned prepreg. The aforementioned metal foil can be made of copper, aluminum, nickel, platinum, silver, gold or alloys thereof. For example, the metal foil may be a copper foil. In a preferred embodiment, the laminate is a copper-clad laminate.

For example, in one embodiment, the metal foil used in the aforementioned laminate can be a hyper very low profile (HVLP) copper foil or a hyper very low profile 2 (HVLP2) copper foil. The matte side of the HVLP copper foil has a roughness Rz≤2 (μm), and the matte side of the HVLP2 copper foil has a roughness Rz≤1.5 (μm). The definition of the roughness Rz is the same as the general definition in the technical field of copper foil, and is not repeated here.

For example, in one embodiment, the aforementioned laminate can be further processed into a printed circuit board after circuit processing, and the manufacturing method of the printed circuit board can be any known manufacturing method.

For example, the article manufactured by the resin composition provided by the present invention has at least one of the following characteristics:

the copper foil peel strength of the copper-containing laminate (HVLP2, Cu thickness is half ounce) measured by referring to the method described in IPC-TM-650 2.4.8 is greater than 3.0 lbs/inch (for example, the copper foil peel strength of the copper-containing laminate ranges from 3.00 lbs/inch to 3.50 lbs/inch); or for example, the copper foil peel strength of the copper-containing laminate is greater than 3.2 lbs/inch (for example, the copper foil peel strength of the copper-containing laminate ranges from 3.20 lbs/inch to 3.50 lbs/inch);

the dielectric constant is less than or equal to 3.50 measured at a frequency of 10 GHz according to the method described in JIS C2565 (for example, the dielectric constant ranges from 3.30 to 3.50); or the dielectric constant is less than or equal to 3.45 (for example, the dielectric constant ranges from 3.35 to 3.45); and/or the dissipation factor is less than or equal to 0.0030 measured at a frequency of 10 GHz according to the method described in JIS C2565 (for example, the dissipation factor ranges from 0.0020 to 0.0030).

The chemical materials used in the following embodiments and comparative embodiments of the present invention are as follows:

SA9000: methacrylate-containing polyphenylene ether resin, available from Sabic.

OPE-2st 2200: vinylbenzyl biphenyl-containing polyphenylene ether resin, available from Mitsubishi Gas.

BMI-70: bis(3-ethyl-5-methyl-4-maleimidobenzene) methane, available from K.I Chemical Co., Ltd.

BMI-3000: maleimide resin of the following formula (3), available from Designer Molecules.

Formula (3)

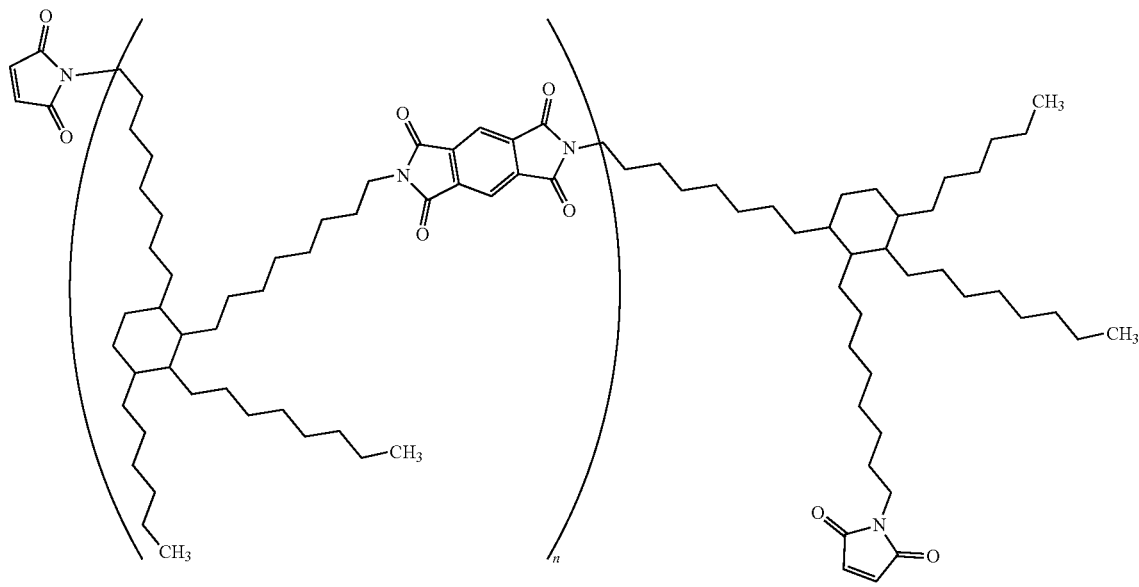

Herein, n is a positive integer of 1 to 10.

Ricon 257: Styrene-butadiene-divinylbenzene terpolymer, available from Cray Valley.

G1726: hydrogenated styrene-butadiene-styrene block copolymer, available from Kraton.

1,2-bis(vinylphenyl) ethane, available from Linchuan Chemical Company.

Triallyl isocyanurate, commercially available.

Ricon 100: vinyl group-containing styrene-butadiene copolymer, available from Cray Valley.

FG1901: hydrogenated styrene-butadiene-styrene block copolymer with maleic anhydride groups, available from Kraton.

SC2050 SXJ: spherical silica, available from Admatechs.
SC2050 SVJ: spherical silica, available from Admatechs.
25B: 2,5-dimethyl-2,5-bis(tert-butylperoxy)-3-hexyne, available from NOF Corporation.

DCP: dicumyl peroxide, available from NOF Corporation.

Mixed solvent: a mixed solvent of toluene and butanone, wherein the weight ratio of toluene and butanone is 60:40.

Synthetic Example 1—Preparation of Resin 1 Having the Structure of the Formula (1)

(A) Catalyst Precursor Synthesis 20 mL of 1,3-dioxolane was added into a glass reactor treated with drying and dehumidification, and then $Zn(Et)_2$ and glycerine were added. After reacting for 1 hour, the catalyst precursor ($Zn(Et)_2$-glycerine) was obtained.

(B) Copolymerization Reaction $Y(CF_3CO_2)_3$ was placed in a high-pressure reactor with a mechanical stirring device. After vacuuming to remove water vapor and oxygen, the catalyst precursor ($Zn(Et)_2$-glycerine) was introduced into the high-pressure reactor, followed by stirring at 60° C. for 2 hours to prepare a catalyst ($Y(CF_3CO_2)_3$—$Zn(Et)_2$-glycerine). Then, 30 mL of 4-vinyl cyclohexene oxide was introduced into the high-pressure reactor, and carbon dioxide gas was introduced to make the system pressure 400 psi. The system temperature was adjusted to 80° C. for the copolymerization reaction of 4-vinyl-epoxycyclohexane with carbon dioxide, and the reaction time was 12 hours. After the copolymerization reaction was completed, the system pressure was reduced to normal pressure (14 psi), and the system temperature was reduced to room temperature (25° C.). Then, an ethanol solution containing 5% hydrochloric acid (about 300 mL) was added to terminate the copolymerization reaction, and the precipitate was separated, which was a solid product A. The solid product A was put into an oven at 80° C. and dried for 12 hours.

(C) Purification of Product A

The dried product A was dissolved in an appropriate amount of acetone (300~500 mL), followed by stirring to obtain a clear solution B. Then, the solution B was slowly dropped into a large amount of ethanol (2000~3000 mL) to precipitate the solid polymer to obtain a product C. The product C was placed in an oven at 80° C. for 12 hours in vacuum for drying to obtain a white solid product D. The product D was a resin with a structure of the formula (1), named as Resin 1, and its number average molecular weight Mn is about 17,000.

Infrared Spectrum (FTIR) Test of the First Resin with the Structure of the Formula (1)

The above-obtained powders of Resin 1 (Mn=17,000) with the structure of the formula (1) were tested by Fourier transform infrared spectrometer (FTIR), and the FTIR spectrum of FIG. 1 was obtained, wherein 1642.6 $cm^{-1}$ indicates the characteristic peak of the vinyl group, 1753.4 $cm^{-1}$ indicates the characteristic peak of the carbonyl group, and 2947.4 $cm^{-1}$ indicates the characteristic peak of the hydroxyl group.

Synthetic Example 2—Preparation of Resin 2 Having the Structure of Formula (1)

The preparation steps of Synthetic example 2 are similar to those of Synthetic example 1, except that the time for the copolymerization reaction of 4-vinyl-epoxycyclohexane with carbon dioxide was 6.5 hours. The obtained product E was a resin with the structure of the formula (1), named as Resin 2, and its number average molecular weight Mn is about 7,000.

According to the following Table 1 and Table 2, the aforesaid chemical materials were formulated to prepare the resin compositions of Embodiments and Comparative embodiments of the present invention, and the resin compositions were further used to prepare various test samples.

Table 1: Components of the Resin Compositions of Embodiments (Unit: Parts by Weight)

TABLE 1

| Components of the resin compositions of Embodiments (Unit: parts by weight) | | | | | | | | |
|---|---|---|---|---|---|---|---|---|
| Component | Type | Name | E1 | E2 | E3 | E4 | E5 | E6 |
| Resin of Formula (1) | Formula (1) Mn = 7,000 | Resin 2 | 10 | — | 5 | 15 | 7 | 5 |
| | Formula (1) Mn = 17,000 | Resin 1 | — | 10 | — | — | 3 | 5 |
| Resin B | Vinyl group-containing polyphenylene ether resin | SA9000 | 70 | 70 | 70 | 70 | 60 | 40 |
| | | OPE-2st 2200 | — | — | — | — | 10 | 30 |
| | Maleimide resin | BMI-70 | — | — | — | — | — | 5 |
| | | BMI-3000 | — | — | — | — | 5 | 5 |
| | Styrene-butadiene-divinylbenzene terpolymer | Ricon 257 | 24 | 24 | 30 | 0 | 20 | 10 |
| | Hydrogenated styrene-butadiene-styrene block copolymer | G1726 | 6 | 6 | 0 | 30 | 5 | 10 |
| | 1,2-bis(vinylphenyl)ethane | | — | — | — | — | 2 | — |
| | Triallyl isocyanurate | | — | — | — | — | 5 | — |

TABLE 1-continued

Components of the resin compositions of Embodiments (Unit: parts by weight)

| Component | Type | Name | E1 | E2 | E3 | E4 | E5 | E6 |
|---|---|---|---|---|---|---|---|---|
| Vinyl group-containing styrene-butadiene copolymer | | Ricon 100 | — | — | — | — | — | — |
| Hydrogenated styrene-butadiene-styrene block copolymer with maleic anhydride groups | | FG1901 | — | — | — | — | — | — |
| Inorganic filler | Silicon dioxide | SC-2050 SXJ | 100 | 100 | 60 | 125 | 80 | 50 |
| | | SC-2050 SVJ | — | — | — | — | — | 40 |
| Hardening initiator | Peroxide | 25B | 0.3 | 0.3 | 0.35 | 0.25 | 0.15 | 0.15 |
| | | DCP | — | — | — | — | — | 0.05 |
| Mixed solvent | | Toluene/Butanone = 60:40 | 110 | 110 | 110 | 120 | 120 | 120 |

TABLE 2

Components of the resin compositions of Comparative embodiments (Unit: parts by weight)

| Component | Type | Name | C1 | C2 | C3 |
|---|---|---|---|---|---|
| Resin of Formula (1) | Formula (1) Mn = 7,000 | Resin 2 | — | — | — |
| | Formula (1) Mn = 17,000 | Resin 1 | — | — | — |
| Resin B | Vinyl group-containing polyphenylene ether resin | SA9000 | 70 | 70 | 70 |
| | | OPE-2st 2200 | — | — | — |
| | Maleimide resin | BMI-70 | — | — | — |
| | | BMI-3000 | — | — | — |
| | Styrene-butadiene-divinylbenzene terpolymer | Ricon 257 | 24 | 24 | 24 |
| | Hydrogenated styrene-butadiene-styrene block copolymer | G1726 | 6 | 6 | 16 |
| | 1,2-bis(vinylphenyl)ethane | | — | — | — |
| | Triallyl isocyanurate | | — | — | — |
| Vinyl group-containing styrene-butadiene copolymer | | Ricon 100 | 10 | — | — |
| Hydrogenated styrene-butadiene-styrene block copolymer with maleic anhydride groups | | FG1901 | — | 10 | — |
| Inorganic filler | Silicon dioxide | SC-2050 SXJ | 100 | 100 | 100 |
| | | SC-2050 SVJ | — | — | — |
| Hardening initiator | Peroxide | 25B | 0.3 | 0.3 | 0.3 |
| | | DCP | — | — | — |
| Mixed solvent | | Toluene/Butanone = 60:40 | 110 | 110 | 110 |

Varnish

According to the amounts shown Table 1 and Table 2, the components of each Embodiments (abbreviated as E, such as E1 to E6) and Comparative embodiments (abbreviated as C, such as C1 to C3) were respectively added into the stirring tank and stirred. After mixing uniformly, a varnish of the resin composition was obtained.

The formulation method of the resin composition of Embodiment E1 is used as an example. 70 parts by weight of SA9000 and 10 parts by weight of Resin 2 were added into a stirring device with 110 parts by weight of the mixed solvent, followed by stirring to completely dissolve and well mix SA9000 and Resin 2. Next, 24 parts by weight of Ricon 257 and 6 parts by weight of G1726 were added. After stirring and mixing well, 100 parts by weight of SC-2050 SXJ was added. The stirring was continued until mixing well, and then 0.3 parts by weight of 25B was added, followed by stirring for 1 hour to obtain the varnish of the resin composition of Embodiment E1.

In addition, according to the amounts shown in Table 1 and Table 2, the varnishes of the resin compositions of Embodiments E2 to E6 and Comparative embodiments C1 to C3 were prepared with reference to the preparation method of the varnish of Embodiment E1.

With reference to the following methods, the varnishes of Embodiments E1 to E6 and Comparative embodiments C1 to C3 were used to prepare the specimens to be tested (samples, which respectively are prepregs, copper-containing laminates 1, copper-containing laminates 2, copper-free laminates 1 and copper-free laminates 2). Then, the characteristic analyses were performed according to the following specific conditions.

Prepreg (Using 2116 L-Glass Fiber Fabric)

The resin compositions in different Embodiments (E1 to E6) and Comparative embodiments (C1 to C3) listed in Table 1 and Table 2 were respectively put into an impregnation tank in batches. The glass fiber fabric (such as 2116 L-glass fiber fabric) was passed through the above impregnation tank, and the resin compositions were adhered to the glass fiber fabric. After heating at 170° C. for 4 minutes, the resin compositions were turned into the semi-cured state (B-Stage) to obtain the prepreg (rein content of about 56%).

Copper-Containing Laminate 1 (or Called as Copper-Clad Laminate 1, which is Prepared by Laminating Two Prepregs)

Two hyper very low profile 2 (HVLP2) copper foils with a thickness of 18 μm and two aforementioned prepregs (each Embodiments or each Comparative embodiments) were provided. One copper foil, two prepregs and one copper foil were laminated in sequence, and the lamination was performed under a vacuum condition at 500 psi and 210° C. for 120 minutes to obtain a copper-containing laminate 1.

Copper-Containing Laminate 2 (or Called as Copper-Clad Laminate 2, which is Prepared by Laminating Four Prepregs)

Two hyper very low profile 2 (HVLP2) copper foils with a thickness of 18 μm and four aforementioned prepregs (each Embodiments or each Comparative embodiments) were provided. One copper foil, four prepregs and one copper foil were laminated in sequence, and the lamination was performed under a vacuum condition at 500 psi and 210° C. for 120 minutes to obtain a copper-containing laminate 2.

Copper-Free Laminate 1 (which is Prepared by Laminating Two Prepregs)

The aforesaid copper-containing laminate 1 was etched to remove the copper foils on both sides to obtain a copper-free laminate 1, which is formed by laminating two prepregs.

Copper-Free Laminate 2 (which is Prepared by Laminating Four Prepregs)

The aforesaid copper-containing laminate 2 was etched to remove the copper foils on both sides to obtain a copper-free laminate 2, which is formed by laminating four prepregs.

The test methods and characteristic analysis items for the aforementioned samples to be tested are explained as follows.

Copper Foil Peel Strength (P/S)

The copper-containing laminate 2 (which is prepared by laminating four prepregs) was cut into a rectangular sample with a width of 24 mm and a length greater than 60 mm, and the copper foil thereon was etched to leave a strip copper foil with a width of 3.18 mm and a length greater than 60 mm. According to the method described in IPC-TM-650 2.4.8, an universal tensile strength testing machine was used to measure the force required to pull the copper foil away from the surface of the laminate (unit: lb/inches, lb/in) at room temperature (about 25° C.). The higher the copper foil tension, the better. The difference between the copper foil tension values of different samples to be tested being greater than or equal to 0.1 lb/in represents a significant difference (there is significant technical difficulty).

Dielectric Constant (Dk)

In the measurement of the dielectric constant, the aforesaid copper-free laminate 1 (which is prepared by laminating two prepregs) was used as the sample to be tested. A microwave dielectrometer (available from Japan AET company) was used. According to the method described in JIS C2565, each sample to be tested was measured at room temperature (about 25° C.) and at a frequency of 10 GHz, to obtain the dielectric constant Dk. The lower the dielectric constant, the better the dielectric property of the sample to be tested. Under the measurement frequency of 10 GHz and the range where the dissipation factor Df value is less than 0.0030, the difference in the Dk value less than 0.01 represents no significant difference in the dissipation factor of the laminates (no significant difference means that there is no significant technical difficulty), and the difference in the Dk value greater than or equal to 0.01 represents a significant difference in the dissipation factor of the laminates (there is significant technical difficulty).

Dissipation Factor (Df)

In the measurement of the dissipation factor, the aforesaid copper-free laminate 1 (which is prepared by laminating two prepregs) was used as the sample to be tested. A microwave dielectrometer (available from Japan AET company) was used. According to the method described in JIS C2565, each sample to be tested was measured at room temperature (about 25° C.) and at a frequency of 10 GHz, to obtain the dissipation factor Df. The lower the dissipation factor, the better the dielectric property of the sample to be tested. Under the measurement frequency of 10 GHz and the range where the dissipation factor Df value is less than 0.0030, the difference in the Df value less than 0.0001 represents no significant difference in the dissipation factor of the laminates (no significant difference means that there is no significant technical difficulty), and the difference in the Df value greater than or equal to 0.0001 represents a significant difference in the dissipation factor of the laminates (there is significant technical difficulty). Under the measurement frequency of 10 GHz and the range where the dissipation factor Df value is greater than 0.0040, the difference in the Df value less than 0.0005 represents no significant difference in the dissipation factor of the laminates, and the difference in the Df value greater than or equal to 0.0005 represents a significant difference in the dissipation factor of the laminates. The test results are shown in Table 3 and Table 4 below.

TABLE 3

The test results of the samples prepared by the resin compositions of Embodiments

| Characteristics | Unit | E1 | E2 | E3 | E4 | E5 | E6 |
|---|---|---|---|---|---|---|---|
| Copper foil peel strength (P/S) | lb/in | 3.25 | 3.27 | 3.21 | 3.28 | 3.35 | 3.38 |
| Dielectric constant (Dk) @10 GHz | — | 3.41 | 3.38 | 3.36 | 3.37 | 3.36 | 3.43 |
| Dissipation factor (Df) @10 GHz | — | 0.0025 | 0.0024 | 0.0025 | 0.0025 | 0.0023 | 0.0026 |

TABLE 4

The test results of the samples prepared by the resin compositions of Comparative embodiments

| Characteristics | Unit | C1 | C2 | C3 |
|---|---|---|---|---|
| Copper foil peel strength (P/S) | lb/in | 2.72 | 2.85 | 2.65 |
| Dielectric constant (Dk) @10 GHz | — | 3.45 | 3.46 | 3.41 |
| Dissipation factor (Df) @10 GHz | — | 0.0025 | 0.0026 | 0.0023 |

As shown in Table 4, the copper-free laminate prepared by the resin composition of Comparative embodiment C3 has a dielectric constant less than 3.5 measured at 10 GHz, and a dissipation factor less than 0.0030 measured at 10 GHz; but the copper-containing laminate prepared by the resin composition of Comparative embodiment C3 has a copper foil peel strength of only 2.65 lbs/inch.

In the resin compositions of Comparative embodiments C1 and C2, vinyl group-containing styrene-butadiene copolymer (Ricon 100) or hydrogenated styrene-butadiene-styrene block copolymer with maleic anhydride groups (FG1901) were respectively used to partially replace the hydrogenated styrene-butadiene-styrene block copolymer (without reactive functional groups) used in Comparative embodiment C3. As shown in Table 4, the copper foil peel strength of the copper-containing laminates prepared by the resin compositions of Comparative embodiments C1 and C2 are slightly improved, but the dielectric constant of the copper-free laminates prepared by the resin compositions of Comparative embodiments C1 and C2 is deteriorated.

As shown in Table 3, the copper-containing laminates prepared by the resin compositions of Embodiments E1 to E4 of the present invention have the copper foil peel strength greater than 3 lbs/inch. In addition, the copper-free laminates prepared by the resin compositions of Embodiments E1 to E4 of the present invention have the dielectric constant less than or equal to 3.5 measured at 10 GHz (especially the dielectric constant less than 3.45 measured at 10 GHz), and the dissipation factor less than or equal to 0.0030 measured at 10 GHz. These results indicate that when the resin having the structure of the formula (1) are added in the resin composition of the present invention, not only the copper foil peel strength can be effective improved, but also the low dielectric constant and low dissipation factor can be maintained.

When the copper-containing laminate prepared by the ultra-low roughness copper foil (such as using HVLP or HVLP2) has the copper foil peel strength greater than 3 lbs/inch, it can ensure that the copper circuit of the printed circuit boards subsequent formed will not peel off. Conversely, if the copper foil peel strength of the copper-containing laminate is less than 3 lbs/inch, there is a great risk that the copper circuits of the printed circuit board will peel off, resulting in the printed circuit board to fail.

As shown in Table 3, the copper-containing laminates prepared by the resin compositions of Embodiments E1 to E6 of the present invention have the copper foil peel strength greater than 3 lbs/inch. In addition, the copper-free laminates prepared by the resin compositions of Embodiments E1 to E6 of the present invention have the dielectric constant less than or equal to 3.45 measured at 10 GHZ, and the dissipation factor less than or equal to 0.0030 measured at 10 GHz. On the contrary, as shown in Table 4, the resin compositions of Comparative embodiments C1 to C3 cannot simultaneously achieve the above three technical effects.

In conclusion, the resin with the structure of the formula (1) is added into the resin composition of the present invention, so the resin layer prepared by the resin composition of the present invention has low dielectric constant and low dissipation factor, and the copper-containing laminate prepared by the resin composition of the present invention has improved copper foil peel strength. Thus, the resin composition provided by the present invention can be applied to fine electronic products.

The invention claimed is:

1. A resin composition, comprising:
   1 part by weight to 20 parts by weight of a first resin represented by the following formula (1); and
   100 parts by weight of a second resin,
   wherein the second resin comprises vinyl group-containing polyphenylene ether resin, maleimide resin, styrene-butadiene-divinylbenzene terpolymer resin, hydrogenated styrene-butadiene-styrene block copolymer resin or a combination thereof,

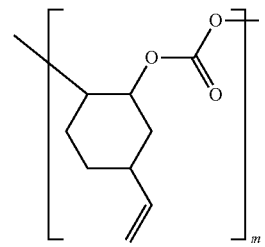

Formula (1)

wherein m is a positive integer of 10 to 250.

2. The resin composition of claim 1, wherein the second resin comprises the vinyl group-containing polyphenylene ether resin, and a content of the vinyl group-containing polyphenylene ether resin is 70 parts by weight.

3. The resin composition of claim 1, wherein the second resin comprises the maleimide resin, and a content of the maleimide resin ranges from 1 part by weight to 40 parts by weight.

4. The resin composition of claim 1, wherein the second resin comprises the styrene-butadiene-divinylbenzene terpolymer resin, and a content of the styrene-butadiene-divinylbenzene terpolymer resin ranges from 1 part by weight to 40 parts by weight.

5. The resin composition of claim 1, wherein the second resin comprises the hydrogenated styrene-butadiene-styrene block copolymer resin, and a content of the hydrogenated styrene-butadiene-styrene block copolymer resin ranges from 1 part by weight to 35 parts by weight.

6. The resin composition of claim 1, wherein the second resin comprises the vinyl group-containing polyphenylene ether resin, the maleimide resin, the styrene-butadiene-divinylbenzene terpolymer resin and the hydrogenated styrene-butadiene-styrene block copolymer resin; wherein a content of the vinyl group-containing polyphenylene ether resin is 70 parts by weight, a content of the maleimide resin ranges from 1 part by weight to 15 parts by weight, a content of the styrene-butadiene-divinylbenzene terpolymer resin ranges from 5 parts by weight to 35 parts by weight, and a content of the hydrogenated styrene-butadiene-styrene block copolymer resin ranges from 1 parts by weight to 15 parts by weight.

7. The resin composition of claim 1, further comprising: 30 parts by weight to 130 parts by weight of an inorganic filler.

8. The resin composition of claim 7, wherein the inorganic filler is silicon dioxide.

9. The resin composition of claim 1, further comprising: 0.01 parts by weight to 0.5 parts by weight of a hardening initiator.

10. The resin composition of claim 9, wherein the hardening initiator is peroxide.

11. A resin composition, comprising:
    1 part by weight to 20 parts by weight of a first resin represented by the following formula (1); and
    70 parts by weight of a vinyl group-containing polyphenylene ether resin,

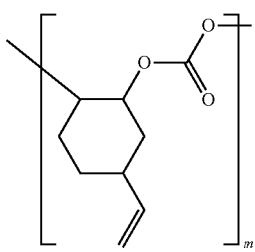

Formula (1)

wherein m is a positive integer of 10 to 250.

12. The resin composition of claim 11, further comprising 20 parts by weight to 40 parts by weight of at least one selected from the group consisting of maleimide resin, styrene-butadiene-divinylbenzene terpolymer resin and hydrogenated styrene-butadiene-styrene block copolymer resin.

13. The resin composition of claim 11, further comprising: 1 part by weight to 40 parts by weight of maleimide resin.

14. The resin composition of claim 11, further comprising: 1 part by weight to 40 parts by weight of styrene-butadiene-divinylbenzene terpolymer resin.

15. The resin composition of claim 11, further comprising: 1 part by weight to 35 parts by weight of hydrogenated styrene-butadiene-styrene block copolymer resin.

16. The resin composition of claim 11, further comprising: 1 part by weight to 15 parts by weight of maleimide resin, 5 parts by weight to 35 parts by weight of styrene-butadiene-divinylbenzene terpolymer resin and 1 part by weight to 15 parts by weight of hydrogenated styrene-butadiene-styrene block copolymer resin.

17. The resin composition of claim 11, further comprising: 30 parts by weight to 130 parts by weight of an inorganic filler.

18. The resin composition of claim 17, wherein the inorganic filler is silicon dioxide.

19. The resin composition of claim 11, further comprising: 0.01 parts by weight to 0.5 parts by weight of a hardening initiator.

20. The resin composition of claim 19, wherein the hardening initiator is peroxide.

21. An article manufactured using the resin composition of claim 1, wherein the article include a prepreg, a resin film, a laminate or a printed circuit board.

* * * * *